(12) United States Patent
Allen

(10) Patent No.: US 11,658,608 B2
(45) Date of Patent: May 23, 2023

(54) DEPLOYABLE SOLAR ARRAY APPARATUS

(71) Applicant: Keith Hunt Allen, Palmer Lake, CO (US)

(72) Inventor: Keith Hunt Allen, Palmer Lake, CO (US)

( * ) Notice: Subject to any disclaimer, the term of this patent is extended or adjusted under 35 U.S.C. 154(b) by 0 days.

(21) Appl. No.: 17/668,716

(22) Filed: Feb. 10, 2022

(65) Prior Publication Data

US 2022/0255499 A1 Aug. 11, 2022

Related U.S. Application Data

(60) Provisional application No. 63/147,837, filed on Feb. 10, 2021.

(51) Int. Cl.
*H02S 30/20* (2014.01)

(52) U.S. Cl.
CPC .................... *H02S 30/20* (2014.12)

(58) Field of Classification Search
CPC ....................................... H02S 30/20
IPC ....................................... H02S 30/20
See application file for complete search history.

(56) References Cited

U.S. PATENT DOCUMENTS

| | | | |
|---|---|---|---|
| 5,969,501 | A | 10/1999 | Glidden et al. |
| 6,396,239 | B1 | 5/2002 | Benn et al. |
| 7,230,819 | B2 | 6/2007 | Muchow et al. |
| 8,593,102 | B2 | 11/2013 | McGuire et al. |
| 9,048,281 | B2 | 6/2015 | Curran |
| 9,352,853 | B2 | 5/2016 | Eskenazi et al. |
| 9,612,039 | B2 | 4/2017 | Meppelink et al. |
| 9,780,720 | B2 | 10/2017 | Ansari |
| 10,630,100 | B2 | 4/2020 | Van Straten |
| 10,666,185 | B2 | 5/2020 | Aikens et al. |
| 2004/0124711 | A1 | 7/2004 | Muchow et al. |
| 2006/0260672 | A1 | 11/2006 | Niederer |
| 2007/0039610 | A1 | 2/2007 | Head et al. |
| 2008/0251115 | A1 | 10/2008 | Thompson et al. |
| 2010/0000592 | A1 | 1/2010 | Ko |
| 2010/0071684 | A1 | 3/2010 | Cowan et al. |
| 2011/0253614 | A1 | 10/2011 | Curran et al. |

FOREIGN PATENT DOCUMENTS

WO 2008155652 A3 1/2010

*Primary Examiner* — Jayne L Mershon
(74) *Attorney, Agent, or Firm* — Jason P. Webb; Pearson Butler

(57) ABSTRACT

A deployable solar array apparatus. There is a telescoping mast, being actuatable between an extended mode and a retracted mode; a pivoting head, coupled to a top portion of the telescoping mast; a plurality of arms, circumferentially and pivotally coupled to the head and extending outwardly therefrom, and actuatable between an extended mode and a retracted mode; and a plurality of solar panels coupled to exterior surfaces of the head and arms.

20 Claims, 8 Drawing Sheets

DEPLOYABLE SOLAR ARRAY APPARATUS

CROSS-REFERENCE TO RELATED APPLICATIONS

This invention claims priority, under 35 U.S.C. § 120, to the United States Provisional Patent Application No. 63/147,837 to Keith Hunt Allen filed on Feb. 10, 2021, which is incorporated by reference herein.

BACKGROUND OF THE INVENTION

Field of the Invention

The present invention relates to solar renewable energy systems, specifically deployable solar panels.

Description of the Related Art

Energy production systems are vital to our infrastructure and especially to remote areas, such as but not limited to operations involving industry, science, and military aims. Such operations often involve remote operations, extreme weather events, and/or man-made perils. Often these operations cannot be connected to existing power infrastructure due to time/resource constraints. Various energy production systems are used, depending on the particular needs. Such systems include but are not limited to solar, wind, water, oil, natural gas, gasoline/diesel, coal, wood, and nuclear energy production systems and etc.

In the related art, it has been known to use solar renewable energy systems to utilize the sun's energy to provide electric power. Photovoltaic panels (also called solar panels) are well known and are used to generate electricity from sunlight. Sunlight is free and so the cost of electricity generated by a photovoltaic panel is extremely low. Accordingly, sunlight provides clean electrical energy with no carbon emissions. Current solar renewable energy systems can be divided into two main groups: commercial and residential. Commercial systems use large, permanent ground mounted structures to generate power en-masse. Residential systems primarily use the roof top as the structure for PV panels. There is overlap with some commercial systems using roof tops and some residential systems using pole and ground mount structures. Both are considered permanent once installed and in both soft costs are considered high.

Some improvements have been made in the field. Examples of references related to the present invention are described below in their own words, and the supporting teachings of each reference are incorporated by reference herein: U.S. Pat. No. 6,396,239, issued to Benn et al., discloses a portable PV modular solar generator. A plurality of wheels are attached to the bottom of a rechargeable battery container. At least one rechargeable battery is contained inside the rechargeable battery container. A power conditioning panel is connected to the rechargeable battery container. At least one photovoltaic panel is pivotally connected. In a preferred embodiment, the rechargeable battery container is a waterproof battery enclosure having a knife switch connection. A mast having a rotation bar is supported by the port brace for supporting the photovoltaic panel is attached to the rotation bar. The power conditioning panel is waterproof, is attached to the mast and has a door. When the door is opened, at least one safety switch is opened, breaking an electric circuit. The waterproof power conditioning panel has a charge controller and an inverter. The charge controller is electrically connected to at least one rechargeable battery and at least one photovoltaic panel, and is capable of receiving auxiliary power inputs.

U.S. Pat. No. 9,780,720, issued to Ansari, discloses a transportable, deployable power system comprising a hybrid power box containing solar panels, wind turbine(s), fuel cells, fuel reformers, and other energy sources. The system could also include waste water and potable water inlet and outlet ports for water treatment. It will also allow for shelf mounted solar and wind turbine installation for disaster recovery, back-up power for telecommunication, military power, homeland security power, off grid homes and water and wastewater packaging domestically and internationally. The present invention is ideal for any situation requiring immediate power and/or water treatment, such as remote construction sites or in emergency situations. The hybrid power box can be mounted to a standard shipping truck, train, or ship, and transported over land and to the desired location.

International Patent Application Publication No.: WO 2008/155652 by Caldera, discloses orientable solar module panel comprising a structure (2) for supporting a plurality of solar modules (21), a movement mechanism which allows the rotation of such structure along a first substantially vertical axis and a second substantially horizontal axis in a way to position the surface of the solar modules in the better position with reference to the direct solar radiation.

U.S. Patent Application Publication No.: 2006/0260672, by Niederer, discloses the supply unit comprises a box type profile frame (1), whose base rests on wheels (2) and whose top side (3), a square frame (16) as seen from above, is placed, said frame containing a solar panel (7). This can be swiveled about a horizontal axis (8) and is connected to one of the top sides of the box type profile frame (1). A peripheral, square frame (5) of same size, each containing a solar panel (6), is connected in a swiveling way to each side of this square frame (16), so that out of the five square frames (16;5) a cube is formed when these frames are swiveled down. The peripherally connected square frames (5) can be swiveled to the top plane of the central square frame (16) and can be locked in this position to the central square frame (16). The box type profile frame (1) contains several box type modules (24-26), which can be inserted like drawers from one side and can be arrested in these inserted positions; these modules are for various functions like accumulation of energy from sun and wind, preparation of drinking water, pumping water, delivery of electric power or direct current hydrogeneration through fuel cells.

The inventions heretofore known suffer from a number of disadvantages which include: not being transportable or semi-transportable, being permanent, not being easy to use, not being turn-key, requiring extensive assembly, not including intelligence, not being controllable remotely, being less amenable to social human settings, not being aesthetically or sizably configurable, not having shape-shifting capabilities and not being rugged.

What is needed is a deployable solar array apparatus that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available solar panel arrays. Accordingly, the present invention has been developed to provide a deployable solar array apparatus.

In one embodiment of the invention, the deployable solar array apparatus may comprise: a telescoping mast, that may be actuatable between an extended mode and/or a retracted mode; a head, that may be coupled to a top portion of the telescoping mast; a plurality of arms, that may be circumferentially and/or pivotally coupled to the head and/or extending outwardly therefrom, and/or actuatable between an extended mode and/or a retracted mode; and/or a plurality of solar panels that may be coupled to exterior surfaces of the head and/or arms. The deployable solar array may further comprise: a housing, that may include side panels, and may be disposed about the mast; and/or bellows that may be circumferentially coupled to the head and/or side panels of the housing.

In another embodiment, the bellows may comprise a flexible membrane. The bellows may also include: a plurality of petals, each petal may be functionally coupled to the head and/or may extend outwardly therefrom; and/or a flexible membrane that may be disposed over the petals. Yet, in one embodiment, the deployable solar array may further comprise a motor. The motor may be functionally coupled to the telescoping mast and/or functionally coupled to the arms such that the motor may power actuation of the mast and/or the plurality of arms between their respective extended modes and/or retracted modes. The arms may include a plurality of pivoting triple clamps that may be releasably coupled to the arms and/or releasably coupled to the plurality of solar panels.

Also, in an embodiment, the deployable solar array may further comprise four pairs of steering bars that may be coupled to the head which serve to steer the solar panels to optimum position for solar energy harvest. A first and/or second pair may be configured to rotate the head about a first axis, and/or a third and/or fourth pair may be configured to rotate the head about a second axis that may not be parallel to the first axis. The arms may each include a hinge and/or the arms may be coupled to the head at the hinges. The telescoping mast may be coupled to a bottom central portion of the head. Additionally, a first side panel is slidably coupled to a second side panel.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
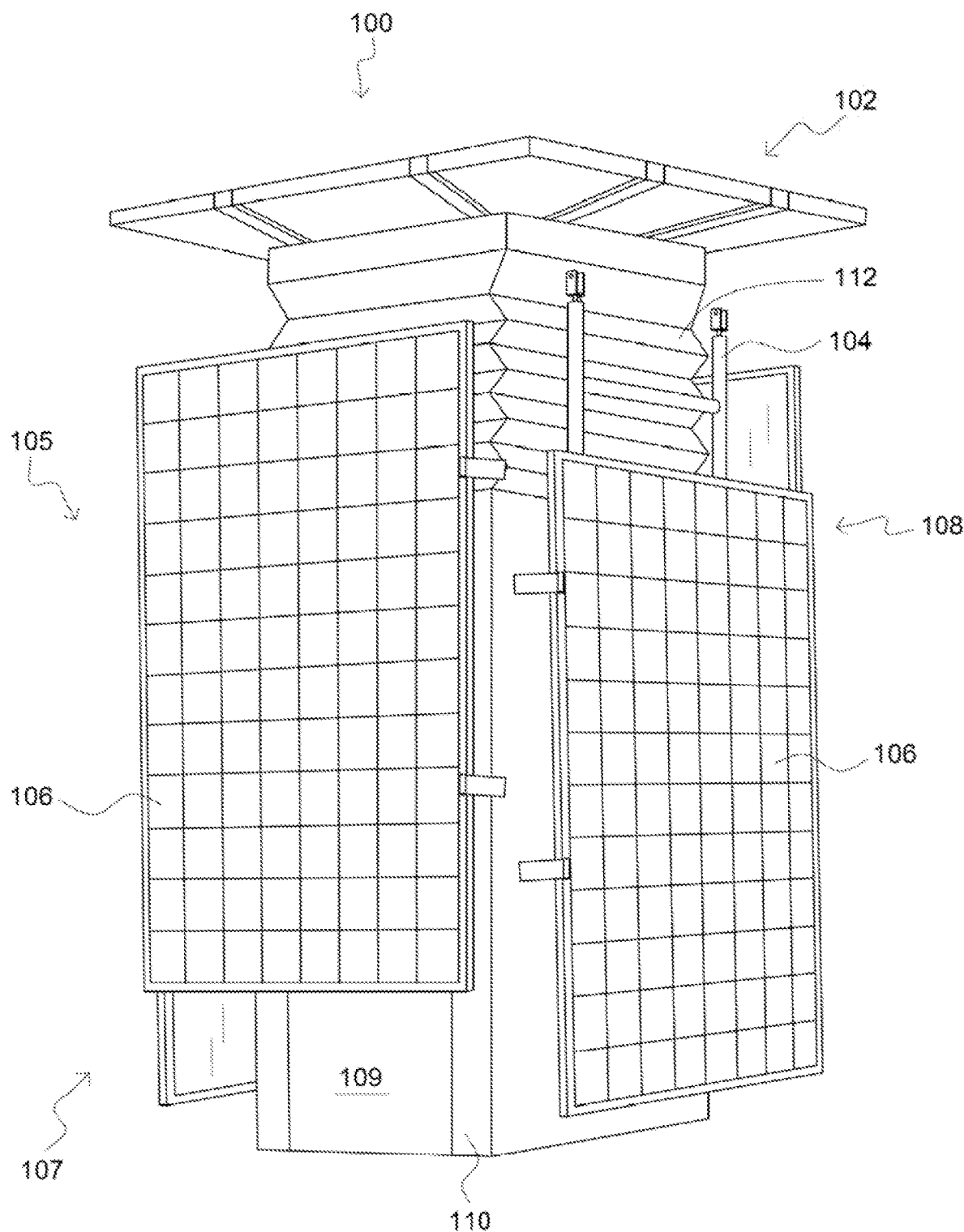
FIG. 1 is a front perspective view of a deployable solar array apparatus, showing a retracted mode, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 illustrates a front perspective view of a deployable solar array apparatus, showing a retracted mode, according to one embodiment of the invention. The illustrated deployable solar array apparatus 100 includes a head 102. A plurality of arms 104 are circumferentially and pivotally coupled to the head 102 and extend outwardly therefrom. In the illustrated embodiment, the arms 104 are shown in a retracted mode 105. A plurality of solar panels 106 are coupled to exterior surfaces of the head 102 and arms 104. The deployable solar array apparatus 100 also includes a housing 107 having side panels 110. In addition, bellows 112 are circumferentially coupled to the head 102 and side panels 110 of the housing 107. Further shown, the housing 107 includes a mobile housing component 108 and a static housing component 109 each comprised of a plurality of side panels 110.

The illustrated apparatus 100 includes a head 102 with a plurality of arms 104 coupled to the head 102. The arms 104 are functionally coupled to the head 102 so that they can pivot, bend, and extend outwardly from the head 102. The arms 104 may be hinged to the head 102 and or include hinges for pivoting, bending, etc. The arms 104 and head 102 support and move a plurality of solar panels 106 that are coupled to the head 102 and arms 104.

The plurality of solar panels 106 that are coupled to the head 102 and arms 104 are pivoted and moved by the head 102 and arms 104 to absorb light and convert the light into energy. The solar panels 106 may be a solar cell panel, a solar electric panel, a photo-voltaic (PV) module, or a solar panel that is an assembly of photo-voltaic cells mounted in a framework for installation and which use sunlight as a source of energy to generate electricity. The plurality of solar panels 106 may be disposed in an array or any other configuration for absorbing sunlight. Accordingly, the solar panels may be such as the LG Solar 435 Watt NeON R Prime Solar Panel of EcoDirect at 2235 Faraday Ave., Suite R, Carlsbad, Calif. 92008.

As shown, the illustrated housing 107 is comprised of a mobile housing component 108, a static housing component 109 and a bellows 112. The stationary housing component 109 anchors the mobile 108 and bellows 112 housing components. Coupled to the mobile housing component 108 is the bellows 112. The bellows 112 is additionally coupled to the head 102 which is coupled to the top of the mast (See e.g., FIG. 4, Item 400). The mobile housing component 108 is coupled to the mast 400 so that as the mast 400 rises, via the turning of an axial lead screw in a rotation constrained nut affixed to the inside of the mast for example, the mobile housing component 108 and the bellows 112 rise and slide into place forming a weatherproof interior capable of flexing during sun tracking. As another example, a scissor jack may be utilized to cause the mast/head and mobile housing components to rise into place. Such scissor jacks may include the Heavy Duty 4.5 Ton Capacity Steel Scissor Jacks Leveling Lift Stabilizer of VIVOHOME at 17800 Castleton Street, #406, City of Industry, Calif. 91748. Accordingly, the housing 107 moves to accommodate, protect, seal, etc. internal components of the apparatus 100. In another non-limiting embodiment where the extended height of a telescoping mast 400 is not advantageous, the movable housing component 108 may be omitted entirely. In such an embodiment, the bellows 112 would be coupled to the static housing 109.

As shown, the housing 107 also includes a mobile housing component 108 and a static housing component 109 functionally coupled to the mobile housing component 108. The illustrated mobile housing component 108 is flexibly coupled to the static housing component 109 so that the mobile housing component 108 may rise and move while the static housing component 109 remains stationary. Accordingly, the mobile housing component 108 moves above the static housing component 109, while the static housing component 109 anchors the apparatus. As a result, the mobile housing component 108 is able to move or be moved freely and easily, and the static housing component 109 is lacking in movement, action, or change.

The illustrated bellows 112 is shown disposed between the mobile housing component 108 and the head 102 such that as the mobile housing rises along with the head 102, the bellows continue to protect the top-most portion of the structure while the mobile housing 108 slides up along the static housing 109. In such an embodiment, the mobile housing 108 is nested either inside or outside the static housing 109 and the bodies thereof overlap. In an alternative embodiment, the bellows is coupled between the head 102 and the static housing 109.

The illustrated bellows 112 are accordion-like pleated, expandable coverings that are similar to a camera bellows. The bellows extends to accommodate the changing distance and angles of the apparatus 100. In one embodiment, the bellows 112 may include a flexible membrane, such as fabric. Accordingly, the bellows 112 can expand and/or allow for shapeshifting of the mobile housing component 108 and/or deployable solar array apparatus 100 as a whole.

In still another embodiment, the bellows is not pleated, but instead includes a plurality of petal-shaped structures that are spring-loaded (See FIG. 8) and thereby provide a very dynamic range of motion.

In operation, a motor provides power to the apparatus for shapeshifting in response to environmental sensors and/or remote operation. A telescoping mast 400 is activated, such as by the push of a button, and extended. The mast 400 includes mobile housing components 108 that slide up and slide into place to keep out weather related elements and grit. A pivoting head 102 on the telescoping mast 400, with arms 104 pivotally attached at the head, is hoisted to a horizontal axis. Solar panels rise above obstructions (foliage, roofs, etc.). The solar panels are unfurled and the arms function to tilt the panels (e.g. for deployment thereof and/or for 1 and/or 2 axis tilting for efficiency purposes). The panels are connected to the arms which are connected to the head which operates to provide 2-axis tilting for efficiency to track day/night and seasons. Thereby the apparatus generates power.

Figure 2:
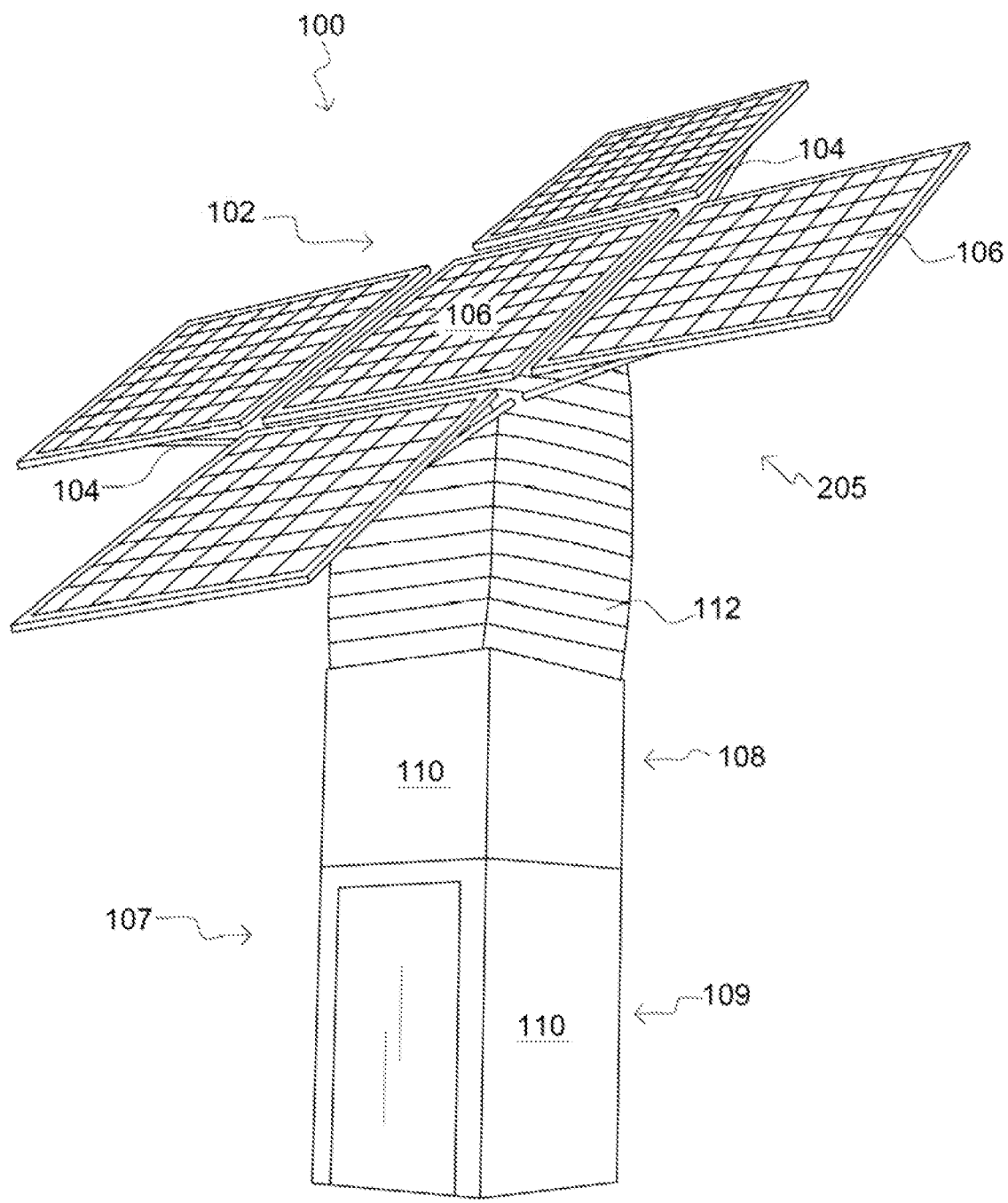
FIG. 2 is a front perspective view of a deployable solar array apparatus, showing an extended mode, according to one embodiment of the invention.
Figure 3:
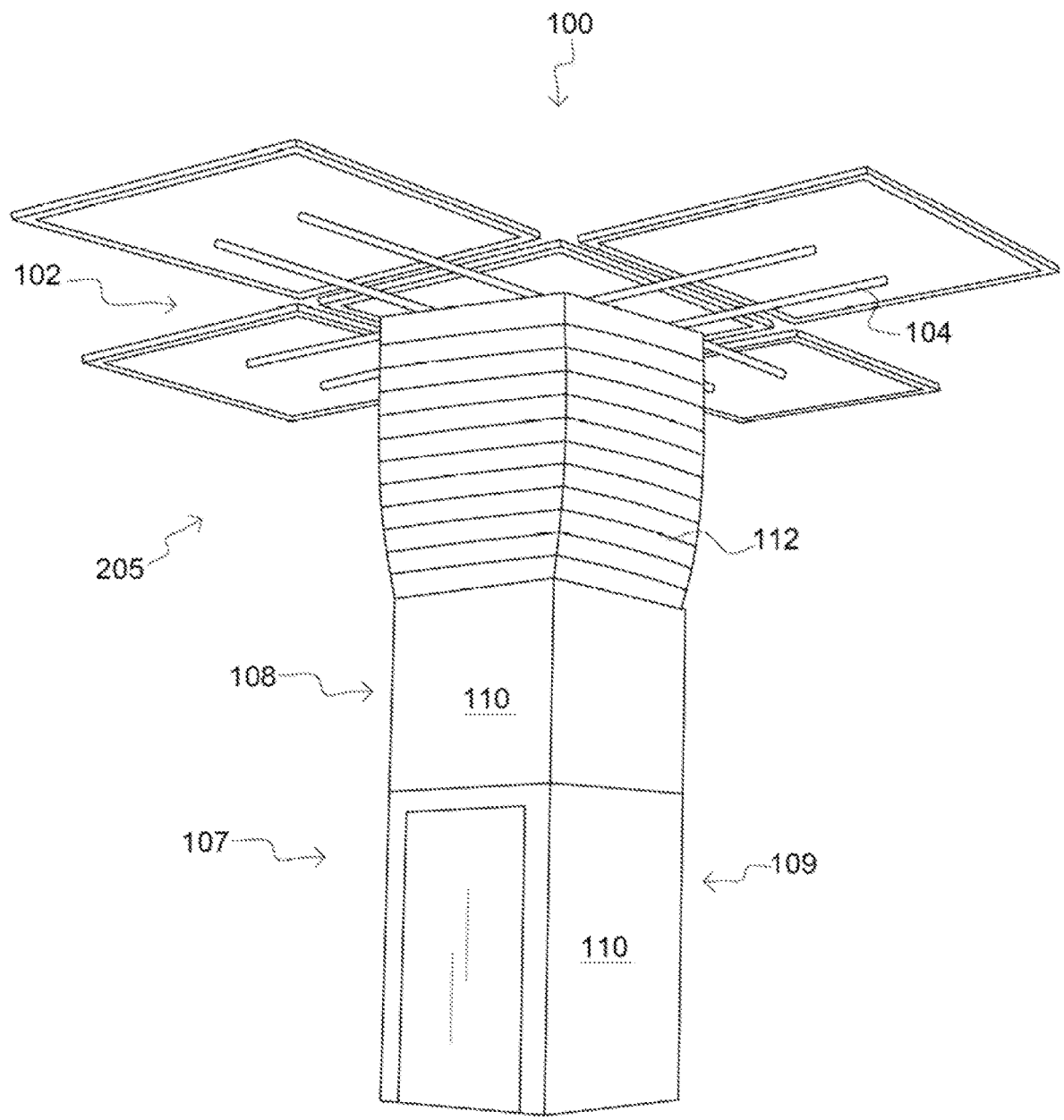
FIG. 3 is a front perspective view of a deployable solar array apparatus, showing an extended mode, according to one embodiment of the invention.

FIGS. 2-3 illustrate a front perspective view of a deployable solar array apparatus, showing an extended mode, according to one embodiment of the invention. As shown, there is a deployable solar array apparatus 100 with a housing 107. The housing 107 includes a mobile housing component 108 and a static housing component 109. The static housing component 109 includes a plurality of side panels 110. Coupled to the top of the mobile housing component 108 are bellows 112. Bellows 112 is coupled to the head 102 and to the mobile housing component 108 so that the bellows 112 is disposed between the head 102 and the mobile housing component 108. A plurality of arms 104 are coupled to the head 102 and extend therefrom. Coupled to exterior surfaces of the head 102 and arms 104 are a plurality of solar panels 104. While the depiction of the embodiment contains mobile housing panels 108, it is understood that mobile housing panels 108 could be omitted if extended mast height was not desirable in which case the bellows 112 would be disposed between head 102 and static housing component 109.

As illustrated in FIGS. 2-3, the arms 104 are shown in an extended mode 205. The arms 104 may be pivotally, hingedly, jointedly, etc. coupled to the head 102 to move, rotate, unfold and/or extend outwardly therefrom. For instance, the arms 104 may be coupled to the head 102 by hinges. Similarly, the arms 104 may be coupled to the head by a joint, such as a ball joint. The arms 104 are pivotally coupled to the head 102 to transform between a retracted mode (See e.g., FIG. 1, Item 105) and an extended mode 205. In an extended mode 205 the arms 104 extend and unfurl the solar panels 104 to absorb light energy.

Figure 4:
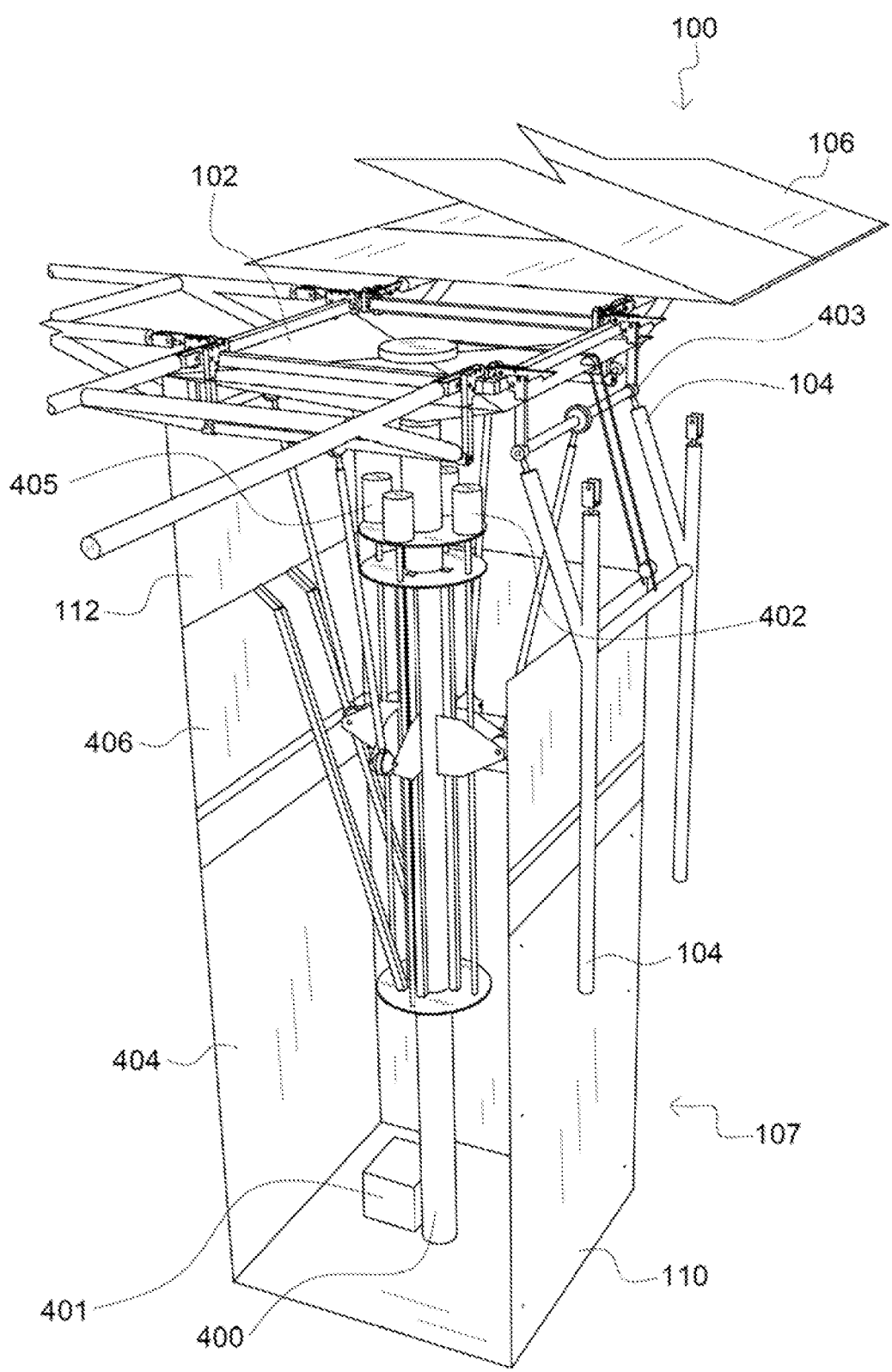
FIG. 4 is a front partial sectional view of a deployable solar array apparatus, showing a telescoping mast of a deployable solar array apparatus, according to one embodiment of the invention.

FIG. 4 illustrates a front partial sectional view of a deployable solar array apparatus, showing a telescoping mast of a deployable solar array apparatus, according to one embodiment of the invention. As shown, the illustrated deployable solar array apparatus 100 includes a telescoping mast 400. The deployable solar array apparatus 100 also includes side panels 110 that are part of a housing 107 disposed about the mast 400. A plurality of side panels 110 exemplified by 404 and 406 comprise the mobile 108 and stationary housing components 109. In one embodiment, the side panels 110 form a primary structure of the mobile housing component 107. A head 102 is coupled to a top portion of the telescoping mast 400. Circumferentially and pivotally coupled to the head 102 is a plurality of arms 104. A plurality of solar panels 106 are coupled to exterior surfaces of the head 102 and arms 104. The arms 104 include hinges 403. Disposed between the head 102 and the mobile housing component 108 is a bellows 112. Further illustrated by FIG. 4, there is a motor 401 functionally coupled to the telescoping mast 400. The illustrated motor 402 and opposite motor 405, opposingly turn lead screws thereby tilting the head via the illustrated connecting rods 502 (See FIG. 5).

As illustrated, the telescoping mast 400 is actuatable between an extended mode (Se e.g., FIG. 2, Item 205) and a retracted mode (See e.g., FIG. 1, Item 105). In one embodiment, the telescoping mast 400 may be comprised of a plurality of tubes, where one tube is smaller than the other to collapse or extend. Accordingly, the telescoping mast 400 may be hollow and cylindrical. The telescoping mast 400 may have any shape, length, etc. for extending and retracting. While the mast 400 is capable of extending and retracting, it is understood that the mast 400 may be stationary and may not necessarily need to raise and lower the height of the invention.

In addition, the telescoping mast 400 supports the head 102 and arms 104. The head 102 is connected to the mast 400 and may turn on a plurality of axis, such as a seasonal axis, a north-south axis, an east-west axis, and so on. As the head 102 pivots, the arms 104, and thereby the solar panels 106, also pivot.

A motor 401 is functionally coupled to the telescoping mast 400 such that the motor 401 powers actuation of the mast 400 between its respective retracted and extended modes. Commensurately and in one embodiment, head 102, arms 104 and mobile housing 108 are also extended and retracted by motor 401. The mast 400 may utilize various means for raising and lowering. It is understood that the mast 400 may be raised and lowered by a motor, a lead screw, hydraulics, scissor jacks, springs, etc. and/or combinations thereof. For instance, in one embodiment, the telescoping mast 400 may be comprised of an inner tube and an outer tube. An axis of the mast may contain a lead screw with a sprocket on the bottom whereupon rides a chain that connects to a reversible electrical motor 401 also with a sprocket on the shaft allowing the mast 400 to be raised and lowered by reversing the motor 401 and achieving telescoping action.

In operation of one embodiment, a motor may pull up and latch one or more arms. There may be one or more latches, springs or mechanical advantage mechanisms functionally coupled to the arms such that the motor is not burdened with the weight and torque requirements of extending the arms. Delatching and reversing the motor causes the arm with solar panels to be lowered. The solar panels are attached to exterior surfaces of the arms, with clamps/brackets and holes in the arms for mounting. The solar panels may be folded, tilted, and/or deployed any desired way to maximize surface area. The moveable/slidable housing allows the embodiment to extend and retract all the while maintaining a weather-proof enclosure. Extending mast 400 allows the deployable solar array apparatus to rise above obstructions to get clear skies for energy harvest. As the arms lift, the flexible bellows allows tilting of the head for maximum energy harvest and yet retains a weather-proof barrier, keeping moisture and debris out of an interior of the housing. The mast, housing and bellows meld together and work in unison to enclose the internals therein when the apparatus is retracted and extended.

Figure 5:
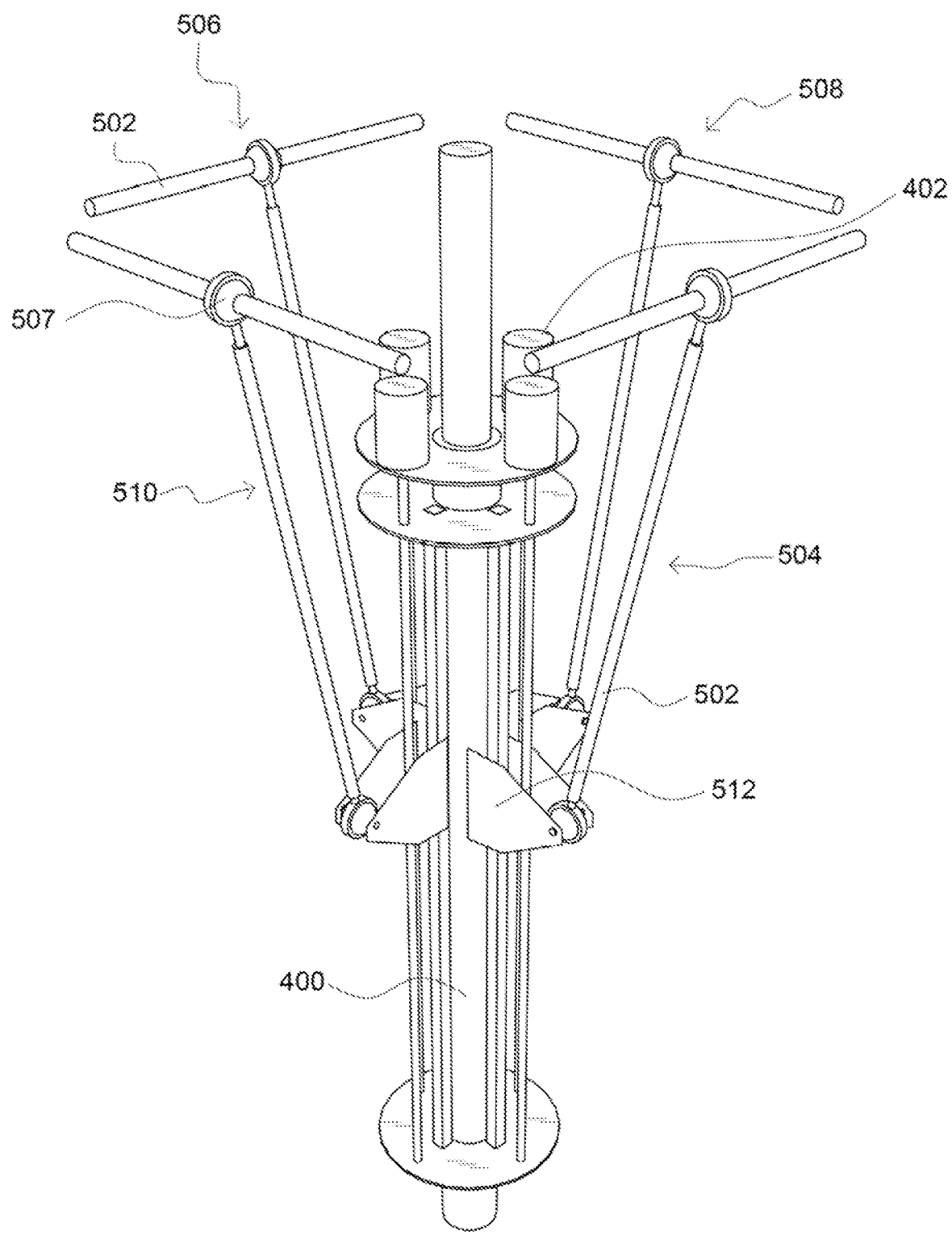
FIG. 5 illustrates a front perspective view of a tilting/steer mechanism of the deployable solar array apparatus, according to one embodiment of the invention.

FIG. 5 illustrates a front perspective view of a tilting/steer mechanism of the deployable solar array apparatus used to adjust the solar panels on the extended arms attached to the head 102 for purposes of maximum energy production during daytime and seasonal changes. Opposing motor pairs (See e.g., FIG. 4, Items 402 and 405) one turning a lead screw up and the other lead screw down, serve to tilt the head by pushing and pulling on opposite sides of the head via rods 510 and then bars 506. Swivels or rod ends 507 allow pivoting at different angles without stressing the mechanical structure. In other embodiments, other mechanical means could be employed to lift and/or latch arms 104.

The illustrated steer bars 502 are configured to rotate, steer/tilt and/or pivot the head (Se e.g., FIG. 4, Item 102). The first and second pairs 504 and 506 are configured to rotate the head about a first axis, and the third and fourth pairs 508 and 510 are configured to rotate the head about a second axis that is not parallel to the first axis, thereby allowing for 2-axis pivoting of the head. For instance, in one embodiment, the first and second pairs 504 and 506 may rotate the head (See e.g., FIG. 4, Item 102) about a north-south axis, and the third and fourth pairs 508 and 510 may rotate the head (See e.g., FIG. 4, Item 102) about an east-west axis. As the head (Se e.g., FIG. 4, Item 102)

rotates, the arms (ee e.g., FIG. 4, Item 104) and the solar panels (See e.g., FIG. 4, Item 106) also rotate.

In one non-limiting embodiment, there may be four lead screws on each side of the head (Se e.g., FIG. 4, Item 102) that are each coupled to the steer bars 502 and allow for pivoting of the head (Se e.g., FIG. 4, Item 102). As one side gets pulled up, the other gets pulled down. Opposing pairs 504, 506 and 508, 510 may be thusly east-west and north-south corresponding to daily and seasonal tilting respectively. Downward travel may be termed pulling and upward travel may be termed pushing to correspond to what a human would physiologically experience. Opposing pairs 504, 506 and 508, 510, with opposite directions of travel, may serve to tilt the head (See e.g., FIG. 4, Item 102) about an axis perpendicular to the opposing pair name; east-west may tilt about a north-south axis and north-south may tilt about an east-west axis. For example, in one embodiment, downward/pulling motion of the east pairs and upward/pushing motion on the west pairs may cause the head and/or arms (See e.g., FIG. 4, Items 102 and 104) to tilt to the east. Conversely, upward/pushing on the north pairs and downward/pulling on the south pairs may cause the head and/or arms (See e.g., FIG. 4, Items 102 and 104) to tilt to the south. Accordingly, the steer bars 502 may have any length, diameter, etc. for pivoting, moving, tilting, rotating, etc. the head (See e.g., FIG. 4, Item 102).

In operation of one embodiment of the invention, there may be four lead screws radially positioned around and parallel to the mast at ninety-degree intervals; one for each arm and corresponding to each point on the compass: north, south, east and west. Each lead screw may be driven by the motor exemplified by motor 402. Each lead screw may have a rigid support rod member to add stiffness and to keep the lead screws from experiencing side loads from trucks 512. The support rod may slide through an enclosed channel in a truck. Changing motor direction may permit the trucks to travel upwards or downwards. Attached to the trucks are steer bars. The steer bars may have rod ends on each end to provide a flexible linkage for smooth tilting motion. The steer bars may include push bars. The push bar may connect to the pivoting head via hinges. The illustrated trucks transfer linear motion to the head from the rotating lead screws.

Figure 6:
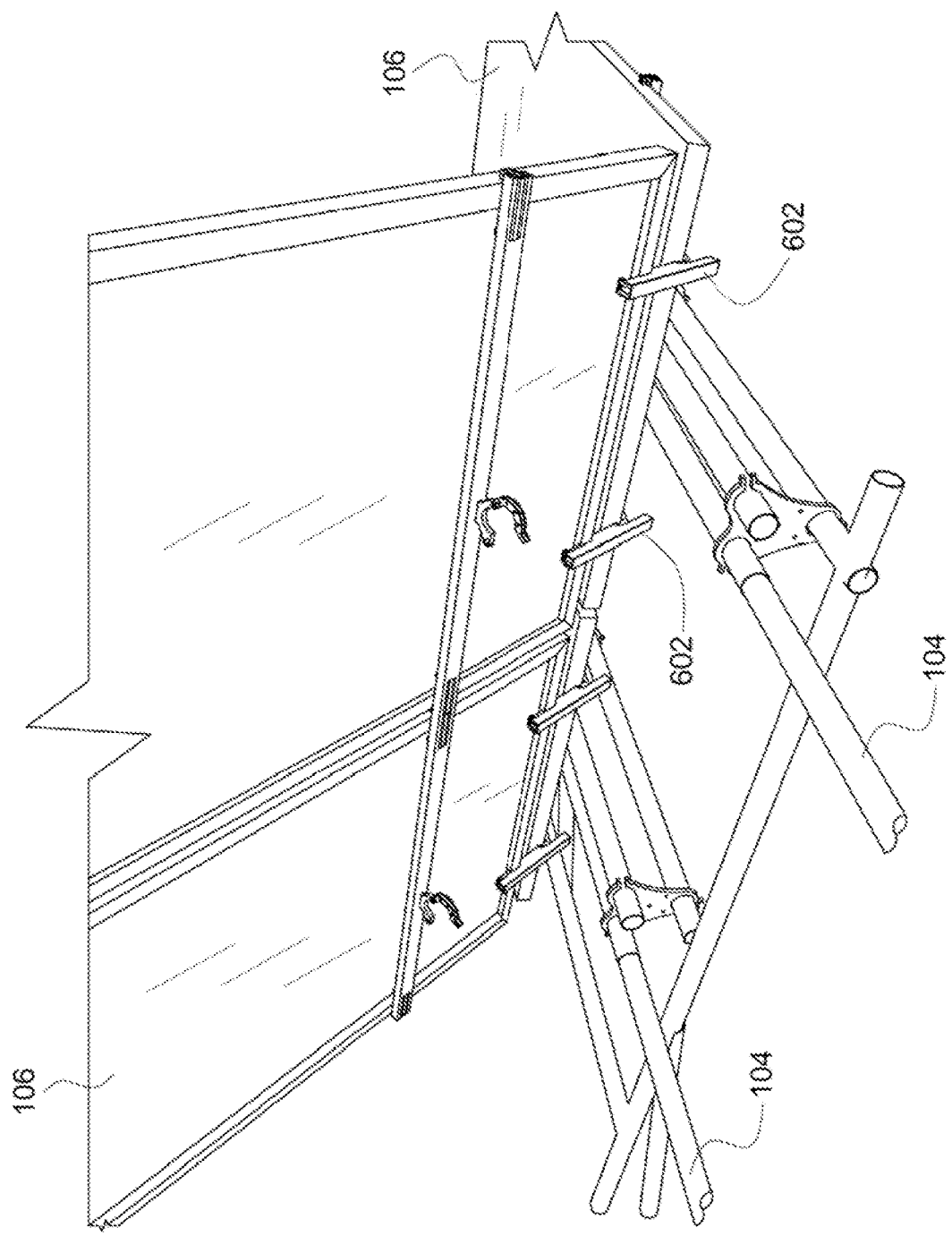
FIG. 6 is a front perspective view of a solar panel and arms, showing a triple clamp of a deployable solar array apparatus, according to one embodiment of the invention.

FIG. 6 illustrates a front perspective view of a solar panel and arms, showing a triple clamp of a deployable solar array apparatus, according to one embodiment of the invention. As shown, there are a plurality of arms 104. Coupled to an exterior surface of the arms 104 is a solar panel 106. A triple clamp 602 is disposed between the arms 104 and the solar panel 106. Advantageously, the illustrated structure allows for a significant increase in the density of energy generating solar panels on the apparatus with only an incremental increase in the volume of the apparatus.

As illustrated, the arms 104 include a plurality of triple clamps 602 releasably coupled to the arms 104 and releasably coupled to the plurality of solar panels 106. Rotation of the arms 104 and the solar panels 106 is accomplished via the triple clamps 602. The triple clamps 602 may be coupled to the arms 104 and tightened by cams. The triple clamps 602 may be loosened to allow the arms 104 to rotate and/or for storage of the arms 104 and solar panels 106 in a retracted mode (See e.g., FIG. 1, Item 105). In one embodiment, the triple clamps 602 may be an upper yoke joined to a lower yoke via a steering stem. For example, the triple clamps 602 may be such as the Neken Kst-kxf-23-14 Standard Triple Clamps Standard Offset 22 mm, by Neken at Zone D'activities de L'eglantier 49610, Murs Erigne, Pays De La Loire, and France.

Figure 7:
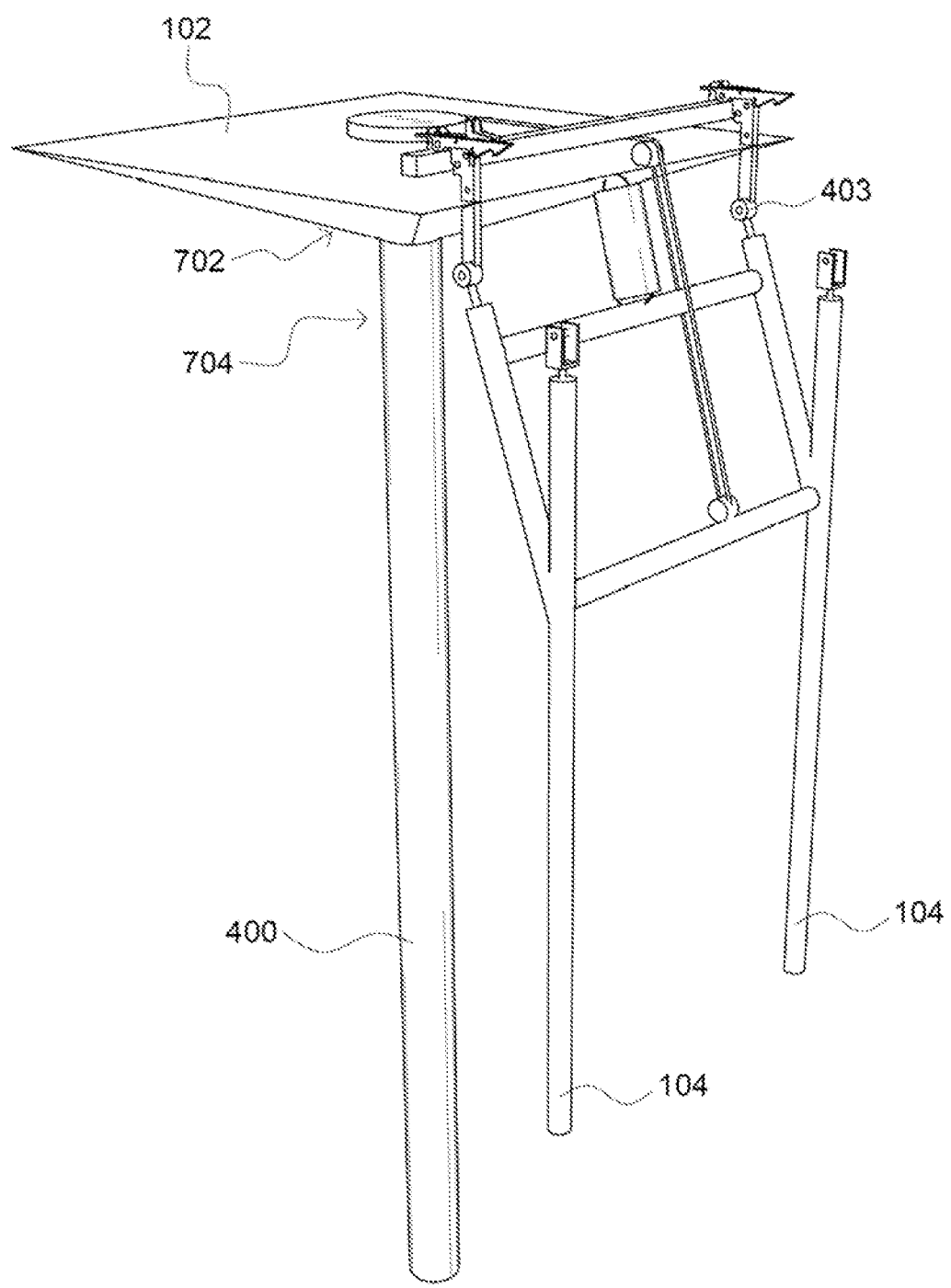
FIG. 7 is a front perspective view of a head and an arm of a deployable solar array apparatus, according to one embodiment of the invention.

FIG. 7 illustrates a front perspective view of a mast, head, and arm of a deployable solar array apparatus, according to one embodiment of the invention. There is shown a head 102 coupled to a top portion 704 of the telescoping mast 400 along a bottom central portion 702 of the head 102. In another embodiment, a plurality of arms 104 could be coupled to the head 102 at hinges exemplified by hinge 403.

The illustrated arm 104 includes a hinge 403. The arm 104 is coupled to the head 102 at a hinge 403. The hinge 403 enables the arm and solar panels (Se e.g., FIG. 1, hem 106) to extend/rise (See e.g., FIG. 2, Item 205) and retract/fall/fold (See e.g., FIG. 1, item 105). In one embodiment, the arm 104 may be hinged 403 along an edge of the head 102 to allow the arm 104 of the embodiment to rotate upward.

Looking to FIG. 7, the arm 104 is coupled to an edge of the head 102 by a hinge 403. In one embodiment, hinges 403 may serve as hangers for connection to arms 104 to allow the arm 104 to rotate upward when a rope is pulled, such as by a pulley system powered by a motor (See e.g., FIG. 4, Item 402) or other mechanical advantage mechanisms. Latches may engage with hooks when the arm 104 is horizontal. Accordingly, arms 104 may be lifted and/or rotated and/or latched into place. For example, arms 104 may be latched into place by hook or latch locks once the arm 104 passes a flange. In addition, it is understood that each arm 104 may have one or more cross brace members for rigidity and/or for a connection point of a mechanical advantage mechanism such a pulley system. Arms 104 may be lowered by slightly lifting the arm 104 to release latches. There is a helper spring or other mechanical advantage mechanisms functionally coupled between the head and the arm that provides additional support and lift therebetween.

Figure 8:
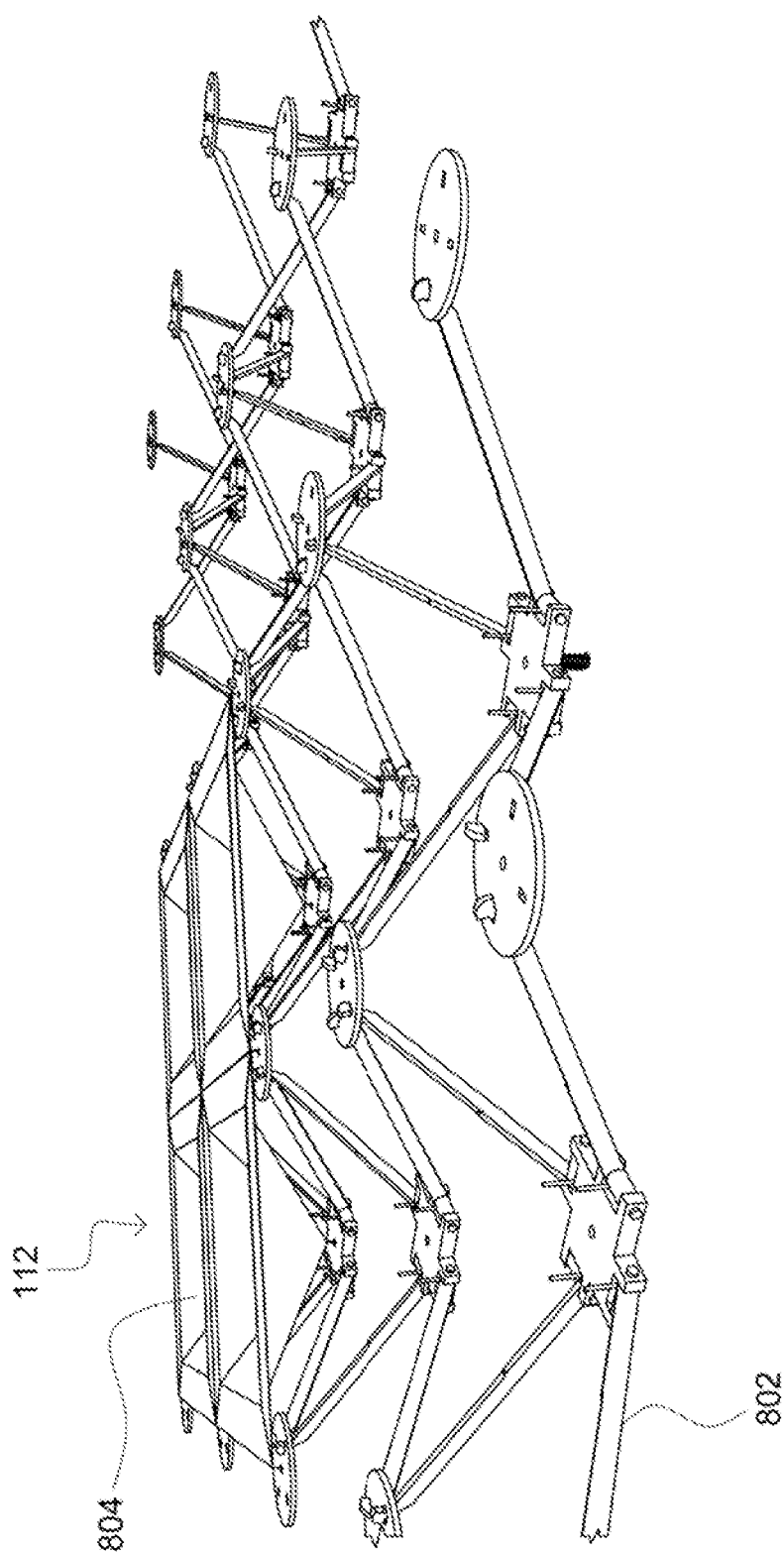
FIG. 8 is a front perspective view of a bellows of a deployable solar array apparatus, according to one embodiment of the invention.

FIG. 8 illustrates a front perspective view of a bellows of a deployable solar array apparatus, according to one embodiment of the invention. As shown, the bellows 112 includes a plurality of petals 802 with a flexible membrane 804 disposed over the petals 802. The petals 802 may each be functionally coupled to the head (Se e.g., FIG. 4, Item 102) and extend outwardly therefrom.

The illustrated bellows 112 is disposed between the pivoting head (See e.g., FIG. 4, Item 102) and the telescoping mast (See e.g., FIG. 4, Item 400) and/or mobile housing component 108. The bellows 112 may be a slinky portion that extends to accommodate changing distance and angles. Each petal 802 is capable of expanding and contracting in any direction to allow the bellows 112 to provide shape-shifting and adaptation to a changing surface area. Accordingly, the bellows 112 may employ spring-tensioned mechanical structures to maintain tension and tautness on the membrane 804. For instance, the bellows 112 may be similar to a "cootie catcher" to extend and retract as the head (Se e.g., FIG. 1, Item 102) tilts and pivots.

As illustrated, the flexible membrane 804 covers the petals 802. The flexible membrane 804 allows the petals 802 to extend and retract while continuously covering the petals 802 and thereby covering or sealing the space between the telescoping mast (Se e.g., FIG. 4, Item 400), the movable housing component 108 and the head (See e.g., FIG. 4, Item 102) and thus keeping out moisture and grit. Accordingly, the flexible membrane 804 may be any membrane that forms a significant barrier to moisture and grit, such as but not limited to: kelvar, ripstop/ballistic nylon, dynema-based fabrics, waterproof textiles, rubber, plastic, silicone, etc. As a result, the bellows 112 is able to extend and retract in three dimensions while allowing the apparatus (Se e.g., FIG. 1, Item 100) to maintain a weatherproof enclosure.

According to one non-limiting embodiment of the invention, there is a "Solar Robot" power generation device that is an intelligent and/or protean system able to withstand harsh environments. The Solar Robot can change its form factor (i.e., shapeshifting) to accommodate a variety of configurations. This, when coupled with autonomy, user configurability, ease of use and ease of transport, would position the Solar Robot to provide solar power in environments and communities where traditional solar technologies have fallen short.

The Solar Robot changes form factor from a configuration that is small and compact to one that is expansive and full-featured, configurations called 'closed' and 'opened' respectively. Shapeshifting from closed to open is accomplished via the unfurling of solar panel containing arms attached to the top of a telescoping mast. An apt albeit simplified metaphor is that of a small compact umbrella; from a closed configuration it can extend upwards and then unfurl to an open configuration with the press of a button. Similarly, in the closed state the Solar Robot can be easily transported on standard tractor trailers, flatbeds, or rail cars. It can also be airlifted to roadless locations or placed inside current generation space launch vehicles. The telescoping mast with solar panels, in addition to providing usable shaded space below, allows the solar array to tower over small to medium sized obstructions such as vehicles or foliage that would otherwise obstruct ground mounted solar systems. Further, the robot can autonomously put itself into the closed and 'hunkered down' configuration to ride out extreme weather or man-made events such as hurricanes, derechos (intense windstorms) or hostile enemy environments. After the danger has passed, it reopens to resume power generation. A prototype robot has survived tropical storms and a hurricane. Shapeshifting also enables quick set-up times, going from trailer to generating power in as little as 30 minutes making it ideal for emergency and disaster relief situations or even electric vehicle (EV) charging during evacuations.

The Solar Robot is designed to be scalable and currently comes in three sizes corresponding to power output: small, medium, and large ranging from 2 to 10 kw. Two-axis sun tracking (seasonal and daily) is standard meaning 20-40% efficiency gains over fixed mounted solar panel systems can be realized. The Solar Robot system can be operated either stand-alone or networked into a micro-grid for greater power output.

Shapeshifting may be controlled through an onboard computer. A full suite of sensors and data sources allow the brain to make proactive, self-preservation decisions in the face of impending extreme weather. Flexible user configuration allows the system to be manually operated or fully autonomous. Additionally, the robot can accept facades that change the visual appearance of the robot—such as a camouflage facade for field operations.

Options extend the usefulness and operating environment of the robot. Hydraulic outriggers allow for rapid, temporary deployment on flat, sloped, or rugged terrain. Aluminum or 316 stainless steel construction is an option for caustic seaside environments or where non-magnetic, low weight requirements dictate. The robot is capable of housing a voluminous and diverse array of equipment inside its cavernous and weatherproof body including but not limited to, battery banks, EV chargers, inverters, micro-grid equipment, telecom equipment, etc. Tamper-proof hardware may be available for locations where malfeasance is a concern.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures show a mast, alternate embodiments may not require the telescoping mast. For instance, if there are no obstructions at ground level, or if the use of the area under the invention is not needed, then a mast may not be necessary. In comparison, another alternate embodiment may not utilize 2-axis tilting if obstructions are many but may retain the mast to get above some nearby obstructions.

Additionally, although the figures illustrate four arms, it is understood that the apparatus may have any number of arms. For example, another alternate embodiment may not need four arms if the invention is up against a hard obstruction like a house and little space exists to raise an arm. In such a scenario two or three arms may suffice. Similarly, additional arms may be desired, such as five or six. More, the northern arm (highest solar panel) may include a wooden dowel to prevent birds from soiling the solar panels and thereby not affect panel power output.

It is also envisioned that the rising and lowering (extending and retracting) of the arms, unfolding of the solar panels, and/or telescoping of the mast may be driven by a variety of driving systems, such as, but not limited to: hydraulics; motor-driven lead screws; block and tackle or chains connected to motors, winches or other motive forces, mechanisms or combinations thereof-even human power. For instance, another alternate embodiment may substitute hand winch cranks for electric gear motors making the invention cheaper and extremely robust. Further, it is envisioned that these moving and protean parts that form the shape-shifting embodiment could facilitate settlement of off-world planets, such as Mars, or even the moon.

Furthermore, the device may accommodate any type of grid connection. The device may have hydraulic outrigger legs to right itself without being bolted to the ground, as well as tamperproof hardware. The device may include an equipment complement such as electric vehicle chargers. The device may also have a redundancy of critical components (such as backup motors) that increase up-time for trackers.

It is expected that there could be numerous variations of the design of this invention. An example is that the mast, housing, side panels, head, bellows, arms, etc. may all contain design elements to assist the deployable solar apparatus with conforming with the landscape on which the apparatus is placed. Accordingly, each model may be customized. For example, the deployable solar apparatus may be designed and/or may include color to resemble a tree, a boulder, a cactus, ice, snow, a cliff, etc. and or may include other types of camouflage. The device may include a user-configured façade that is customized to a user's liking. For instance, the device may include vinyl wrap, stamped metal, etc. Likewise, the design of the device may be scalable and each device may be constructed in different sizes and dimensions, such as small, medium, and large.

Finally, it is envisioned that the components of the device may be constructed of a variety of materials, such as, but not limited to: metal, glass, rubber, plastic, and textiles. For instance, the components of the device may include a variety of metals, such as: aluminum, stainless steel, regular steel, and titanium.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A deployable solar array apparatus, comprising:
   a. a telescoping mast, being actuatable between an extended mode and a retracted mode;
   b. a head, coupled to a top portion of the telescoping mast;
   c. a plurality of arms, circumferentially and pivotally coupled to the head and extending outwardly therefrom, and actuatable between an extended mode and a retracted mode; and
   d. a plurality of solar panels coupled to exterior surfaces of the head and arms.

2. The deployable solar array of claim 1, further comprising:
   a. a housing, including side panels, disposed about the mast; and
   b. bellows circumferentially coupled to the head.

3. The deployable solar array of claim 2, wherein the bellows comprises a flexible membrane also coupled to the side panels.

4. The deployable solar array of claim 2, wherein the bellows includes:
   a. a plurality of petals, each petal being functionally coupled to the head and extending outwardly therefrom; and
   b. a flexible membrane disposed over the petals.

5. The deployable solar array of claim 2, wherein a first side panel is slidably coupled to a second side panel.

6. The deployable solar array of claim 1, further comprising a motor, functionally coupled to the telescoping mast and functionally coupled to the arms such that the motor powers actuation of the mast and the plurality of arms between their respective extended modes and retracted modes.

7. The deployable solar array of claim 1, wherein the arms include a plurality of pivoting triple clamps releasably coupled to the arms and releasably coupled to the plurality of solar panels.

8. The deployable solar array of claim 1, further comprising four pairs of steer bars functionally coupled to the head, wherein a first and second pair are configured to rotate the head about a first axis, and a third and fourth pair are configured to rotate the head about a second axis that is not parallel to the first axis, thereby allowing for 2-axis pivoting of the head.

9. The deployable solar array of claim 8, wherein the arms each include a hinge and wherein the arms are coupled to the head at the hinges.

10. The deployable solar array of claim 1, wherein the telescoping mast is coupled to a bottom central portion of the head.

11. A deployable solar array apparatus, comprising:
    a. a telescoping mast, being actuatable between an extended mode and a retracted mode;
    b. a head, coupled to a top portion of the telescoping mast;
    c. a plurality of arms, circumferentially and pivotally coupled to the head and extending outwardly therefrom, and actuatable between an extended mode and a retracted mode;
    d. a plurality of solar panels coupled to exterior surfaces of the head and arms;
    e. a housing, including side panels, disposed about the mast; and
    f. a flexible bellows circumferentially coupled to the head and side panels of the housing.

12. The deployable solar array of claim 11, wherein the bellows comprises a flexible membrane.

13. The deployable solar array of claim 12, wherein the bellows includes
    a. a plurality of petals, each petal being functionally coupled to the head and extending outwardly therefrom; and
    b. a flexible membrane disposed over the petals.

14. The deployable solar array of claim 13, further comprising a motor, functionally coupled to the telescoping mast and functionally coupled to the arms, such that the motor powers actuation of the mast and the plurality of arms between their respective extended modes and retracted modes.

15. The deployable solar array of claim 14, wherein the arms include a plurality of pivoting triple clamps releasably coupled to the arms and releasably coupled to the plurality of solar panels.

16. The deployable solar array of claim 5, further comprising four pairs of steer bars functionally coupled to the head, wherein a first and second pair are configured to rotate the head about a first axis, and a third and fourth pair are configured to rotate the head about an second axis that is not parallel to the first axis, thereby allowing for 2-axis pivoting of the head.

17. The deployable solar array of claim 16, wherein the arms each include a hinge and wherein the arms are coupled to the head at the hinges.

18. The deployable solar array of claim 17, wherein the telescoping mast is coupled to a bottom central portion of the head.

19. The deployable solar array of claim 18, wherein a first side panel is slidably coupled to a second side panel.

20. A deployable solar array apparatus, comprising:
    a. a telescoping mast, being actuatable between an extended mode and a retracted mode;
    b. a pivoting head, coupled to a top central portion of the telescoping mast, and including a plurality of steer bars functionally coupled to the head and configured to steer the head about an axis,
    c. a plurality of arms, circumferentially and pivotally coupled to the head and extending outwardly therefrom, and actuatable between an extended mode and a retracted mode, including a plurality of pivoting triple clamps releasably coupled to the arms, and including a plurality of hinges, the hinges coupling the arms to the head;
    d. a plurality of solar panels coupled to exterior surfaces of the head and arms, wherein the pivoting triple claims are releasably coupled to the solar panels;
    e. a housing, including side panels, disposed about the mast, wherein a first side panel is slidably coupled to the second side panel;

f. a flexible, three-dimensional bellows circumferentially coupled to the head and side panels of the housing, and including a plurality of petals, each petal being functionally coupled to the head and extending outwardly therefrom, and a flexible membrane disposed over the petals; and g. a motor, functionally coupled to the telescoping mast and functionally coupled to the arms, such that the motor powers actuation of the mast and the plurality of arms between their respective extended modes and retracted modes.

* * * * *